May 26, 1964  R. A. HAWLEY  3,134,681
METHOD OF FILLING A FOOD MOLD
Original Filed May 2, 1960
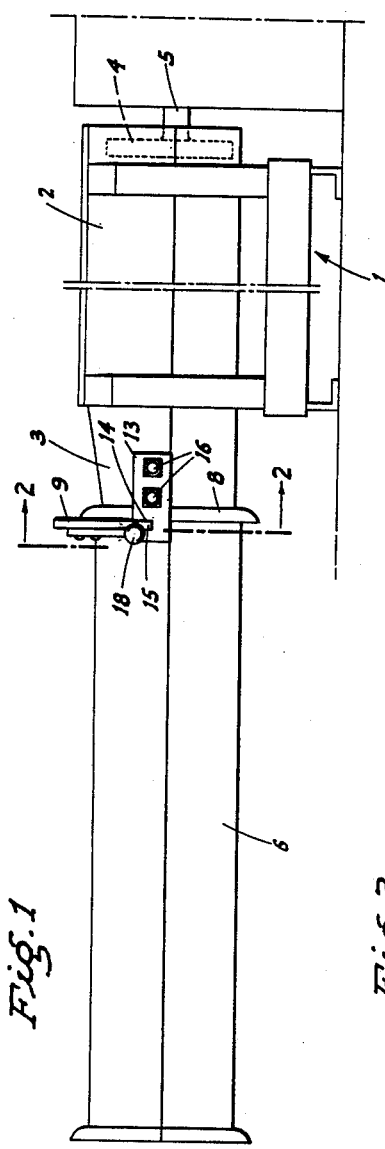
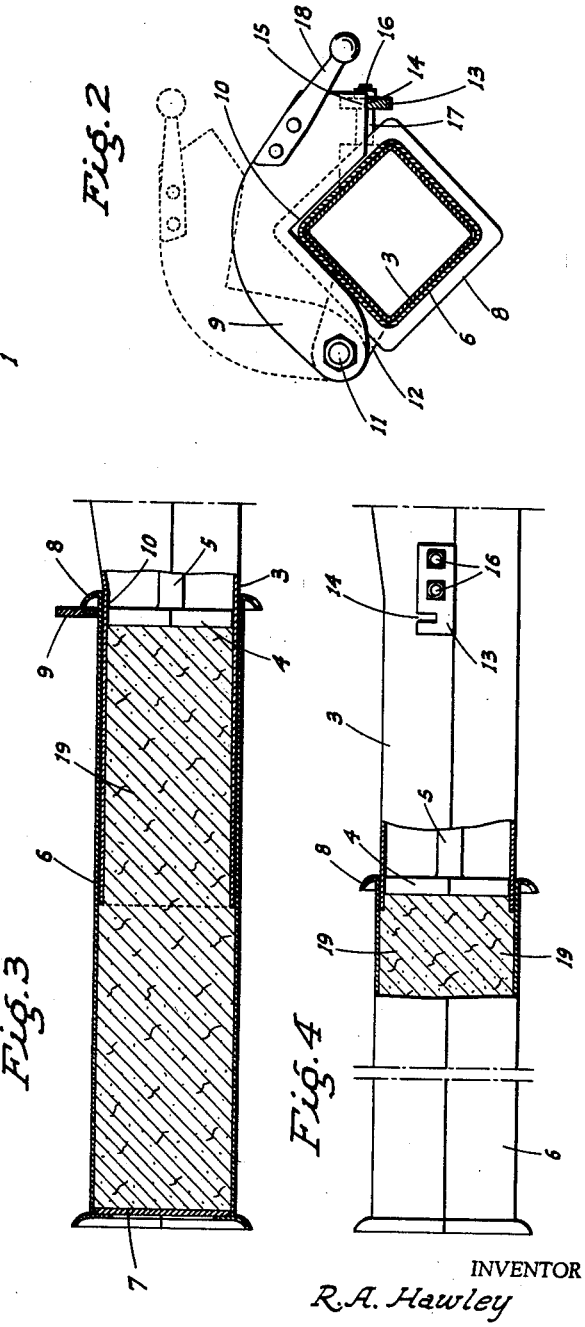
INVENTOR
R.A. Hawley
BY Webster & Webster
ATTYS.

United States Patent Office 3,134,681
Patented May 26, 1964

3,134,681
METHOD OF FILLING A FOOD MOLD
Richard A. Hawley, Oakland, Calif., assignor to Meat Packers Equipment Co., Oakland, Calif., a corporation of California
Original application May 2, 1960, Ser. No. 26,095, now Patent No. 3,061,345, dated Oct. 30, 1962. Divided and this application Sept. 10, 1962, Ser. No. 222,506
1 Claim. (Cl. 99—174)

This invention relates to, and it is a major object to provide, a novel method of filling a food mold; the method preferably being practiced with a mold loader of that type wherein a food product, such as boneless ham, or other meat, is forced by a plunger through a stuffing horn into a mold telescopically engaged on the horn. More particularly the mold loader includes a latch between the horn and mold adapted to releasably connect therebetween upon the mold being advanced for only a portion of its length onto said horn.

It is a further important object of this invention to provide a method of filling a food mold which, in addition to so partially advancing the mold onto and releasably connecting the same with the horn, includes the steps of then forcing the food product from the horn into and filling the portion of the mold beyond the horn, thereafter releasing said connection, and lastly forcing an additional amount of the food product from the horn into the mold to continue the filling thereof until substantially full, while allowing said mold to simultaneously slide off the horn under the forcing pressure.

An additional object of the invention is to provide a method of filling a food mold, as above, which greatly facilitates the operation, and materially reduces the amount of manual effort required from the time the mold is first mounted on the horn until such mold is substantially fully loaded.

Another object of the invention is to provide a practical and efficient method of filling a food mold.

These objects are accomplished in the manner as will fully appear by a perusal of the following specification and claims.

The drawings illustrate the preferred apparatus for the practice of the method, and in which drawings:

FIG. 1 is a side elevation of a mold as mounted on the horn of a conventional loading apparatus, and with the mold latched against retractive movement.

FIG. 2 is an enlarged cross section taken on line 2—2 of FIG. 1.

FIG. 3 is a fragmentary longitudial elevation, mainly in section, of the horn showing the mold mounted thereon and latched; the mold being loaded as far as possible before the latch is released.

FIG. 4 is a similar view, partly in section, of the horn and mold after the release of the latch, and showing the plunger fully advanced and the mold substantially fully loaded and retracted from the horn.

The present application is a division of application Serial No. 26,095, filed May 2, 1960, now U.S. Patent No. 3,061,345.

Referring now more particularly to the drawings, and to the characters of reference marker thereon, the mold loader—preferred for the practice of the method—is generally at 1. Such mold loader, which is generally conventional, includes a press chamber 2 in which the meat is initially formed to a predetermined cross section, and from which the meat, or other food product, is forced into a horizontal stuffing horn 3 by a plunger 4 fixed on the free end of a piston rod 5 projecting from a fluid pressure cylinder, as usual. The stroke of the plunger is such that said plunger can travel from the rear end of the chamber 2, as indicated in FIG. 1, to the front end of horn 3, as shown in FIG. 4.

Slidably fitting onto the horn is a meat mold 6, of tubular open-ended form, and which at its outer or base end is normally closed by a removable insert plate 7. The mold is provided at its top or forward end with a rigid outwardly projecting flange 8 thereabout.

The horn 3 is of square form in cross section, and is disposed with its opposite corners in vertical and horizontal planes, as clearly shown in FIG. 2. The mold is of the same form, and is arranged to advance onto the horn to a point such that the outer end of the horn is then located substantially midway of the length of the mold, as shown in FIG. 2.

A transverse latch plate 9, disposed in a vertical plane, is formed at its lower edge with an inverted right-angle V-shaped notch 10 of a size to straddle the adjacent upwardly facing walls of the mold 6.

The plate 9 at one lateral end is swivelly mounted at one side of the horn 3 on a pin 11 which extends lengthwise of the horn and is secured on an ear 12 which projects laterally from the horn. This ear is located on the horn at a point such as to form a stop for the advance of the mold onto the horn, and so that the latch plate 9 will be disposed directly behind the mold flange 8 when the mold has reached the above recited midway position on the horn.

A vertical latch engaging plate 13, having a depending notch 14 therein, is provided to receive the adjacent end 15 of the swinging latch plate 9 laterally out from the V-notch 10 when the plate 9 is swung down to a fully lowered position over the mold 6. This plate 13 is rigidly supported from the horn by suitable means, such as bolts 16. These bolts are set back from the notch 14 a sufficient distance to allow the mold flange 8 to be disposed back of the notch, and said bolts are provided with spacers 17 between the horn and the plate 13 so that the latter is held laterally out from the horn a sufficient distance for the mold flange 8 to clear the plate 13, as shown in FIG. 2, and when the mold 6 is being slid to its advanced position on the horn.

In order to control the swinging of the latch plate 9, said plate is provided with a handle 18 projecting laterally of the loader from the end of the plate opposite the pivot pin 11.

The above described apparatus is employed, in the performance of the present method, as follows:

The empy mold 6 to be loaded is first slid onto the horn 3; the latch plate 9 being then swung up and held out of the way until the advance of the mold is halted by the stop 12 and the mold flange 8 is beyond said latch plate. The latter is then lowered over the mold and in front of the flange, as shown in FIG. 3, and so that the end 15 of the latch plate is engaged in the notch 14 of the fixed plate 13, as shown in FIGS. 1 and 2.

The plunger 4, which at that time is at the back of the press chamber 2 of the loader, is then advanced to force the meat 19 from said chamber into the foremost or bottom portion of the mold. This advance of the plunger is continued until the mold is filled from the bottom plate 7 to the outer end of the horn, at which time the plunger reaches a point adjacent the zone of the latch plate 9, as shown in FIG. 3. At the same time, the portion of the horn beyond the plunger is still filled with meat, while the portion of the mold which overlaps or telescopes the horn remains empty.

The plunger advance is then temporarily halted in order to relieve the pressure on the mold and enable the operator to swing the latch plate 9 up and clear of the mold flange 8, as indicated in dotted lines in FIG. 2.

The advance of the plunger is thereafter continued so that the remaining meat is forced from the horn and into the mold; the latter simultaneously sliding or backing freely off the horn at the same speed as the advance of the plunger. The mold thus becomes practically completely filled or loaded by the time the horn is emptied, as shown in FIG. 4.

From the foregoing description it will be readily seen that there has been described a method which fulfills the objects of the invention, as set forth herein.

While this specification sets forth the present and preferred steps of the method, still in practice such deviations therefrom may be resorted to as do not form a departure from the spirit of the invention, as defined by the appended claims.

Having thus described the invention, the following is claimed as new and useful, and upon which Letters Patent are desired:

A method of filling an elongated tubular, horn-fitting food mold, from the stuffing horn of a food-mold loader, comprising the steps of slidably advancing the mold part way only onto the horn, releasably securing the mold in such advanced position and against sliding retraction from the horn, then forcing food from the horn into the mold to substantially fill the portion of the latter beyond said horn, thereafter releasing the mold, and finally forcing additional food from the horn into the mold to substantially complete the filling thereof; the mold being slidably advanced onto the horn for a distance approximately one-half the length of the mold, and the step of forcing such additional food from the horn into the mold imparts, under the food pressure, sliding retraction to said mold for substantially a corresponding distance.

References Cited in the file of this patent

UNITED STATES PATENTS

| | | |
|---|---|---|
| 2,917,888 | Hawley | Dec. 22, 1959 |
| 2,922,186 | Sartore | Jan. 26, 1960 |